US008042368B2

United States Patent
Brüggenbrock et al.

(10) Patent No.: US 8,042,368 B2
(45) Date of Patent: Oct. 25, 2011

(54) METHOD AND APPARATUS FOR THE PRODUCTION OF A LONGITUDINAL SEAM WELDED HOLLOW PROFILE

(75) Inventors: Michael Brüggenbrock, Rosendahl (DE); Thomas Flehmig, Ratingen (DE); Wladimir Rituper, Duisburg (DE); Mohamed Tohfa, Duisburg (DE)

(73) Assignee: ThyssenKrupp Steel AG, Duisburg (DE)

( * ) Notice: Subject to any disclaimer, the term of this patent is extended or adjusted under 35 U.S.C. 154(b) by 746 days.

(21) Appl. No.: 11/660,567

(22) PCT Filed: Aug. 20, 2005

(86) PCT No.: PCT/EP2005/009027
§ 371 (c)(1),
(2), (4) Date: May 9, 2008

(87) PCT Pub. No.: WO2006/021391
PCT Pub. Date: Mar. 2, 2006

(65) Prior Publication Data
US 2008/0092615 A1    Apr. 24, 2008

(30) Foreign Application Priority Data

Aug. 25, 2004   (DE) .......................... 10 2004 041 024

(51) Int. Cl.
*B21D 39/02* (2006.01)

(52) U.S. Cl. ............... 72/51; 72/48; 72/368; 72/370.01; 228/17.5

(58) Field of Classification Search ................ 72/48, 51, 72/61, 367.1, 368, 370.01, 370.22, 389.1; 228/144, 146, 151, 17.5, 44.5, 49.1, 49.3
See application file for complete search history.

(56) References Cited

U.S. PATENT DOCUMENTS

| 1,478,480 | A | * | 12/1923 | Lowe | 72/369 |
| 1,879,077 | A | * | 9/1932 | Carlsen | 72/368 |
| 1,879,078 | A | * | 9/1932 | Carlsen | 72/368 |
| 2,066,004 | A | * | 12/1936 | Hitt | 72/401 |
| 3,802,239 | A | * | 4/1974 | Karmann et al. | 72/51 |

(Continued)

FOREIGN PATENT DOCUMENTS

DE          966 11 C          7/1957

(Continued)

*Primary Examiner* — Edward Tolan
(74) *Attorney, Agent, or Firm* — Proskauer Rose LLP

(57) ABSTRACT

To produce hollow profiles from sheet-metal blanks, the invention uses at least two process steps to form said blanks into a slit profile which is subsequently welded to produce the finished welded profile. For this purpose a mandrel is used which cooperates with a first tool part in the first step, and with a second tool part in the second step, such as to form a gap with the recess of each tool part into which a portion of the sheet-metal blank is guided. Shaping the sheet-metal blank in at least two steps means that a mandrel that is a self-contained component and can therefore be moved by a simple control device can be used to support the sheet-metal blank while the slit profile is being created. This considerably reduces the equipment needed to produce the hollow profile. Moreover, forming the sheet-metal blank into the slit profile in at least two steps also considerably improves the reliability with which this shaping takes place.

17 Claims, 5 Drawing Sheets

U.S. PATENT DOCUMENTS 3,846,610 A * 11/1974 Asselborn et al. .............. 219/61
5,499,580 A * 3/1996 Hoffmann et al. ............ 101/375
5,657,922 A * 8/1997 Lowery et al. ................ 228/144
6,012,315 A * 1/2000 Sekido et al. ...................... 72/51
6,286,351 B1 * 9/2001 Schulze ............................ 72/60
7,909,226 B2 * 3/2011 Bruggenbrock et al. .... 228/17.5

FOREIGN PATENT DOCUMENTS

| DE | 4432674 | 2/1996 |
|---|---|---|
| EP | 0701878 | 3/1996 |
| WO | WO 94/22608 A | 10/1994 |
| WO | WO 99/67037 A | 12/1999 |

* cited by examiner

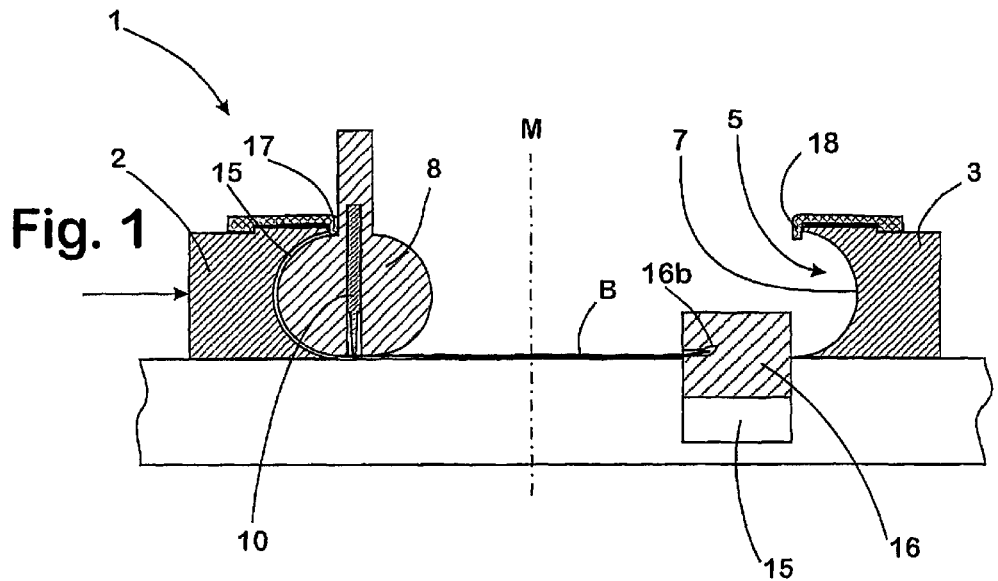
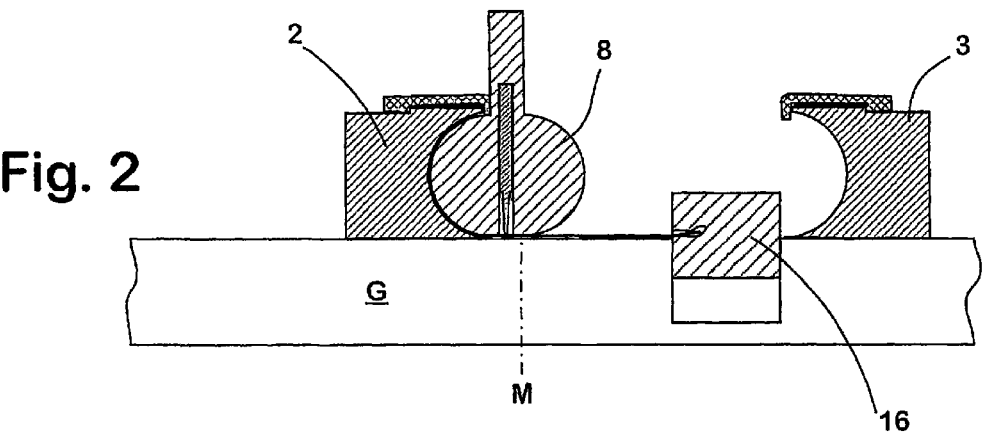
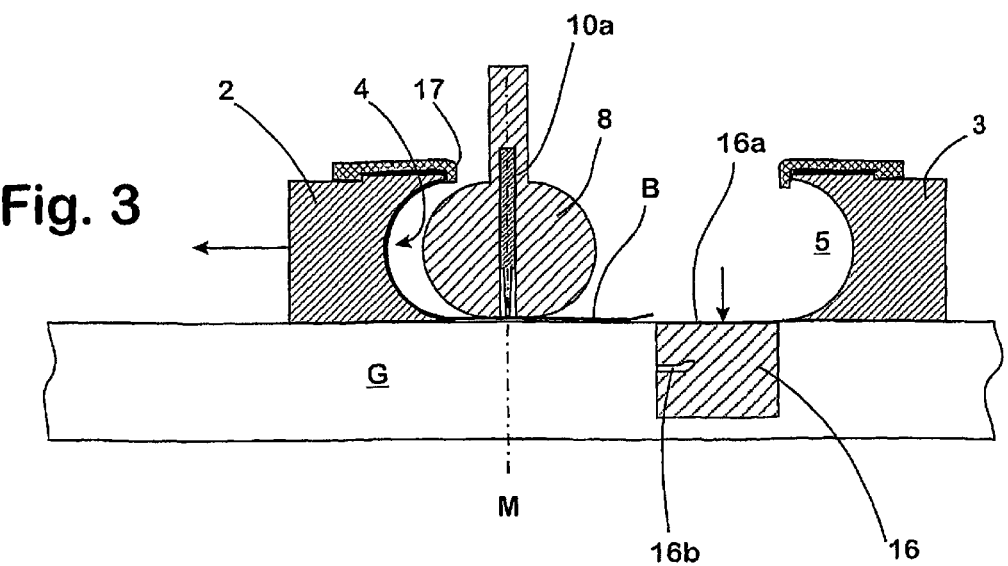

METHOD AND APPARATUS FOR THE PRODUCTION OF A LONGITUDINAL SEAM WELDED HOLLOW PROFILE

BACKGROUND

The invention relates to a method and an apparatus for the production of a longitudinal seam welded hollow profile from a sheet-metal blank with parallel longitudinal edges.

In the automobile industry, welded open profiles are being increasingly replaced by thin-walled hollow profiles, for which longitudinal seam welded tubes are the starting stock. Having small wall thicknesses, these components are designed to achieve minimum weight and maximum utilisation of material.

To ensure the technical functionality of such space-frame structures, it is necessary to have control over the production process for the components, right down to the final shaping step.

The profile-forming process in which the tubular elements that are used as hollow profiles are formed is an important part of the process sequence. Custom profiles known as "tailored tubes" are generally formed in a discontinuous operation, that is to say, from ready cut blanks. Tailored tubes are tubular elements that are made from sheet-metal sections with material properties that are adapted to the stresses and demands that arise during practical use or during the shaping process.

Various options are available for forming sheet-metal blanks into finished welded profiles. However, most solutions use separate work stations for forming and welding (DE 44 32 674 C1).

An apparatus of the abovementioned type that enables longitudinal seam welded tubular elements to be produced on one station is known for example from German patent specification No. 966 111. In this apparatus, the sheet-metal blank is formed into a slit tube and welded. For this purpose, a flat sheet is held between two tool halves that are mutually movable on a tool carrier and disposed in mirror-image relationship to one another, each with a half-shell recess that defines the external contour of the tube that is to be produced. The longitudinal edges of the sheet-metal blank are oriented parallel to the recesses in the tool halves such that the tool halves receive the edges that are adjacent to them as they are driven together and, viewed in cross-section, move the edges towards one another along a circular arc. While the tool halves come together, the sheet metal blank is held by holders positioned at the ends of the centre line of the sheet-metal blank adjacent to the two short edges of the sheet-metal blank. This ensures that when the tool halves are driven together, the sheet-metal blank is uniformly moved along the contour defined by the recesses in the tool halves until its longitudinal edges meet one another at the apex of the curve. The slit tube thereby formed is held in this position for its longitudinal edges to be welded together. To make the slit area of the slit tube accessible, the upper end portions of the tool halves are then hinged open. Thereafter, the adjacent longitudinal edges in the area of the slit are welded together.

A major disadvantage of the procedure known from German patent specification No. 966 111 is that the processed metal sheet must have a certain minimum stiffness. This is the only way to ensure that the metal sheet curves uniformly to form a slit tube when the tool halves are driven together. This method cannot be used to form thin metal sheets into a tube with a precisely predetermined cross-sectional shape, because they uncontrollably form edges and folds during shaping which render the resulting tubular element useless. Welding a slit tube formed by the method known from German patent specification No. 966 111 will also result in unwanted distortion if the metal sheet is so slender that it cannot withstand the forces that unavoidably act on it during welding.

One attempt to overcome the disadvantages of apparatuses of the above-described type is known from WO 99/67037. The procedure known from this specification combines forming and welding on one workstation. A tool is used which, in the manner of German patent specification No. 966 111, comprises two tool halves that can be moved towards one another on a tool carrier, each with a cylindrical half-shell recess. In addition, an internal mandrel half is associated with each of the recesses of the tool halves, positioned within each recess and rigidly fastened to each of the tool halves, with a gap left between its peripheral surface and the inside surface of the recess. This forms an annular space in the region of the recess in each tool half.

To form the tubular element, the thin metal sheet to be shaped is placed between the two tool halves such that when the tool halves are subsequently moved towards one another, its longitudinal edges are guided into the annular space formed in each of the tool halves. As the tool halves continue to come together, the longitudinal edges are pushed further up the longitudinal gap and the metal sheet is curved into a slit tube. The support that is afforded in the region of the annular space to the sheet-metal blank on both the inside and outside of the metal sheet ensures that no unwanted fold or edge formation occurs.

This forming process, which is known as "rolling", is complete when the longitudinal edges meet at the apex of the resulting slit tube. After the edge joint has been rounded off with a roller, this slit tube can be welded together along the slit without having to be moved to another apparatus.

Although the method known from WO 99/67037 enables precisely-shaped tubular elements to be produced, in practice it has a number of disadvantages. For example, the divided construction of the internal mandrel requires a high degree of manufacturing precision for the tools that are used in the known apparatus. Moreover, the machine is complex in design, because it requires complicated pull-off units to remove the finished welded tubular hollow profile from the divided internal mandrel, and special hold-down means during the forming step. In addition, particularly when thin metal sheets are used, there is still the risk of edge stresses causing undesirable distortion in the area of the welded seam during welding.

With the above-described prior art as its starting point, the object of the invention is to provide a method and an apparatus for producing precisely-formed hollow profiles having a reduced requirement for equipment and shorter production times.

As regards the method, this object is achieved by a method for the production of a longitudinal seam welded hollow profile from a sheet-metal blank with defined longitudinal edges wherein the sheet-metal blank is placed between two tool parts lying in a starting position in which they are apart, each provided with a recess determining the external shape of at least one section of the hollow profile that is to be produced, wherein a mandrel, whose external shape defines the internal shape of the hollow profile that is to be produced, is then positioned relative to the recess of one tool part such that a gap is formed between its peripheral surface and the inside surface of the recess, the thickness thereof being slightly greater than the thickness of the sheet-metal blank that is to be shaped, wherein the metal sheet is held in the area of the half that is distant from the mandrel, wherein the tool part adjacent to the mandrel is moved together with the mandrel, with the gap intact, in the direction of the longitudinal edge of the sheet-metal blank that is distant from the mandrel such that the sheet-metal blank runs into the gap along its longitudinal edge that is adjacent to the mandrel until it reaches an insertion limit, wherein the mandrel is positioned relative to the recess of the second tool part such that a gap is formed between the external surface of the mandrel and the inside surface of the said recess, the thickness thereof being slightly greater than the thickness of the sheet-metal blank that is to be shaped, wherein the tool part now adjacent to the mandrel is moved together with the mandrel, with the gap intact, in the direction of the longitudinal edge of the sheet-metal blank that is distant from the mandrel such that the sheet-metal blank runs into the gap along its longitudinal edge that is adjacent to the mandrel until it reaches an insertion limit and a slit profile that surrounds the mandrel about its peripheral surfaces is formed from the sheet-metal blank, wherein the mandrel is moved out from the interior of the slit profile, wherein the longitudinal edges of the sheet-metal blank that define the slit are welded together, the slit profile being supported by the tool parts, and wherein the tool parts are moved to their starting position in order for the finished welded hollow profile to be removed from the tool parts.

In contrast to the prior art described in WO 99/67037, the invention uses at least two steps to form the sheet-metal blank into a slit profile that is subsequently welded to produce the finished hollow profile. For this purpose a mandrel is used which cooperates with the first tool part in the first step, and with the second tool part in the second step, such as to form a gap with the recess of each tool part into which a portion of the sheet-metal blank is guided.

Shaping the sheet-metal blank in at least two steps means that a mandrel that is a self-contained component and can therefore be moved by a simple control device can be used to support the sheet-metal blank while the slit profile is being created. This in itself considerably reduces the equipment needed to produce the hollow profile.

Moreover, forming the sheet-metal blank into the slit profile in at least two steps also considerably improves the reliability with which this shaping takes place. Only one half of the sheet-metal blank is shaped at any one time, while the other half is securely held. This results in improved stability of the sheet-metal blank during shaping, so that consequently the overall shaping process can be faster. The risk of disruption caused by the metal sheet being bent out of shape inside the gap is thus minimized. This means that the sheet-metal blank can be inserted into the gap at a greater speed. Moreover, the resources needed to separate the mandrel and the hollow profile are also reduced because the mandrel can be moved as a whole, so that its movements too can be rapid. Consequently, even though the method of the invention is carried out in two steps, production time as a whole is reduced by comparison with production times attainable in the prior art and precision is improved at the same time.

As regards the apparatus, the above object is accordingly achieved by an apparatus for producing a longitudinal seam welded hollow profile from a sheet-metal blank with defined longitudinal edges, provided with at least two tool parts that can be moved together into a forming position from a starting position in which they are apart, and that each have a recess determining the external shape of at least one section of the hollow profile that is to be produced, and with a welding device for welding together the longitudinal edges of the sheet-metal blank after it has been formed into a slit profile, wherein, in accordance with the invention, there are provided a mandrel carried by a control device that moves it from a first position in which it is positioned in the recess of a first tool part with a gap between the inside surface of the recess of the said tool part and the peripheral surface of the mandrel, into a second position in which it is positioned in the recess of the second tool part with a gap between the inside surface of the recess of said tool part and the peripheral surface of the mandrel, and a holding device for holding the sheet-metal blank in the region of one of its longitudinal edges.

A particularly simple and rapid method of removing the mandrel from the hollow profile that is to be produced consists, in an advantageous embodiment of the invention, in moving the tool parts, together with the portions of the sheet-metal blanks lying in their recesses, sufficiently far apart for the mandrel to be moved through the enlarged opening between the two longitudinal edges of the slit profile.

The dimensional stability of hollow profiles produced in accordance with the invention can be improved by pushing the tool parts together, once the mandrel has been moved out of the slit profile, until the edge joint is closed or its width has reached a minimum. In this manner, variations in shape and dimensions can also be minimised in the region of the edge joint and the weld that is to be made there. Moreover, minimizing the slit width makes welding easier. The longitudinal edges along the slit of the slit profile that is preformed from the sheet-metal blank can be particularly easily and reliably brought together if the desired width of the slit is determined by a tongue held in the slit. The equipment required for this purpose can be minimised if the tongue is carried by the mandrel. Preferably, the tongue is sword-shaped and extends along the length of the slit of the slit profile.

The precision with which a hollow profile produced in accordance with the invention is formed can be additionally improved by using at least two steps to close the tool parts together in order to set up the edge joint of the slit profile that is preformed from the sheet-metal blank. Each step can be used to size the slit profile, so that the shape of the slit profile is ever more closely matched at each stage of the forming process to the required final shape of the finished hollow profile. This multistep forming process can be assisted by providing the tongue with at least one shoulder, and in particular with two shoulders of different thickness. Where two shoulders of different thickness are present, the first can determine the desired width of the slit in the first step, and the second can determine the desired width of the slit in the second step of the closing movement.

After welding, an internal high-pressure forming process can be used for further shaping. With the tool parts still closed, internal high-pressure forming enables additional shape elements to be introduced into the hollow profile. Recesses can be provided in the tool parts for this purpose, adjustments to the predetermined shape being made in this manner.

In another variant of the method of the invention that minimizes the equipment that is required, the mandrel is lowered onto the sheet-metal blank so that it exerts a pressure that securely holds the sheet-metal blank on an underlying surface.

SUMMARY OF THE INVENTION

The method of the invention can be further simplified if the stop in the tool parts that defines the insertion limit for the sheet-metal blanks can be moved from an operating position in which it is located on the longitudinal edge of the recess, to a resting position. In this resting position the longitudinal edges of the slit profile from the sheet-metal blank that are to be welded together are easily accessible, so that adjusting the desired slit width of the slit profile and welding itself can both be carried out without any difficulty.

Additional shape elements, such as beads or similar embossings, for hollow profiles obtained in accordance with the invention can be simply produced if in an apparatus in accordance with the invention the mandrel is provided with an embossing device for embossing the metal sheet placed around it. To enable even larger-volume shape elements to be formed reliably, the embossing device can take the form of embossing punches that are movable beyond the periphery of the mandrel, and the shape elements present in the recesses of the tool parts can form the counterpiece part for the shape produced by the embossing device. Similarly, an embossing device can be provided in the region of at least one of the recesses of the tool parts, the embossing device in this instance also being in the form of an embossing punch and a shape element in the mandrel providing the counterpiece part for the shape formed by the embossing device. The embossing devices are preferably hydraulically operated, so as to reliably exert the required forces. Embossing devices that are operated pneumatically, mechanically or electrically are also possible.

The additional gap thickness that is required to insert the sheet-metal blank into the gap between the peripheral surface of the mandrel and the inside surface of a recess can be achieved simply by making the external shape of the mandrel a little smaller than the internal shape of the hollow profile that is to be produced. Practical tests have shown that it is sufficient for it to be up to 0.2 mm smaller than the desired internal shape of the hollow profile that is to be produced, in other words the thickness of the gap need only be up to 0.2 mm greater than the thickness of the metal sheet that is being worked.

Other advantageous embodiments of the invention are evident from the dependent claims and are described in greater detail below with reference to the drawing which illustrates one exemplary embodiment. In the diagrammatic drawings, which are vertical sections at right angles to the longitudinal direction, and unless otherwise stated:

BRIEF DESCRIPTION OF THE DRAWINGS

FIGS. 1 to 11 are views of an apparatus for forming a tubular hollow profile shown in various operating positions.

DETAILED DESCRIPTION OF THE DRAWINGS

Figure 4:
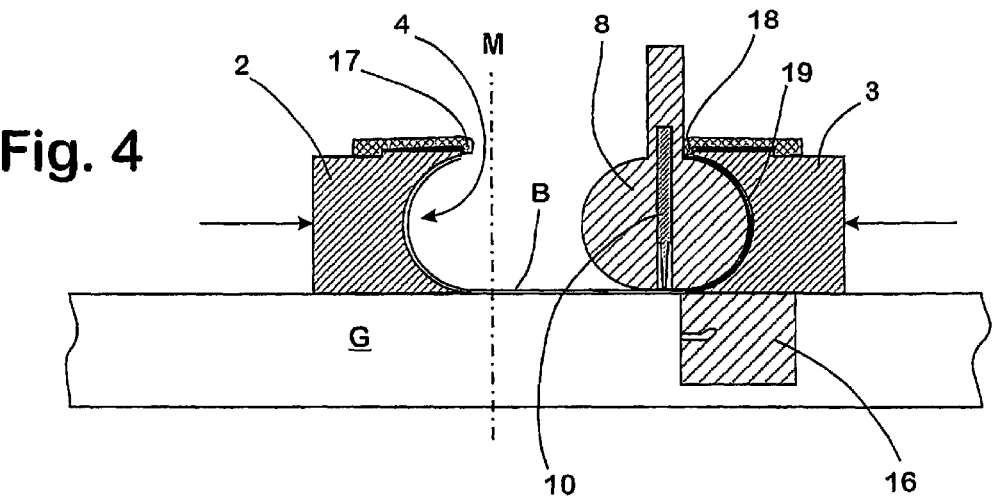

The apparatus 1 for producing a longitudinal seam welded tubular hollow profile R comprises two tool parts 2, 3 mounted on a base plate G such as to be movable relative to one another. The working length of the apparatus 1 for the production of hollow profiles R in the form of tubular elements is, for example, up to 3,000 mm.

Control devices that are not shown are provided to move the tool parts 2, 3 together and apart, whereof a plurality, for example four, can be arranged in a spaced apart manner in the longitudinal direction of the tool parts 2, 3 in order to move the tool parts 2, 3 as uniformly as possible and for the forces exerted by the tool parts 2, 3 to be likewise transferred uniformly. The control devices are adapted to move the tool parts 2, 3 at a speed of from 1 mm/s to 80 mm/s and to exert a force of at least 7,500 kN.

In the face of the tool parts 2, 3 that is adjacent to the other respective tool part 2, 3 there is formed a half-shell recess 4, 5. The radius of curvature of the inside surfaces 6, 7 of the recesses 4, 5 corresponds to the external radius of the hollow profile R that is to be produced.

The apparatus 1 is also provided with a solid mandrel 8 which can be moved by means of a control device, which is not shown, from a stand-by position into its various operating positions. The control device which is not shown is arranged in such manner as to move the mandrel 8 vertically in order to exert a holding force on a sheet-metal blank B placed on the base plate G between the tool parts 2, 3 which are in their starting position.

In the region of its crown adjacent to the base plate G, there is formed in the mandrel 8 a groove-shaped recess 9. The recess 9 forms a guide for a sword-shaped fillet-like tongue 10 whose length corresponds to the length of the mandrel 8. The height of the recess 9 corresponds to at least the height of the tongue 10 such that when the mandrel 8 lies against the sheet-metal blank B, the tongue 10 is fully and automatically inserted into the recess 9, and when the mandrel 8 is raised, it is moved into an extended position by a control device that is not shown, or automatically moves by the action of gravity to this extended position in which it projects beyond the downwardly-directed crown of the mandrel 8. In the extended position, the tongue 10 is supported by securing elements that are not shown.

The tongue 10 has an upper portion 10a of rectangular cross-section by means of which it is inserted in the recess 9. The portion 10a is connected to a first shoulder 10b extending along the length of the mandrel 8 and positioned centrally relative to portion 10a when viewed in cross-section. The thickness of the first shoulder 10b in its region adjacent to the upper portion 10a corresponds to the desired width of the slit Z of a tubular slit profile Sr formed from the sheet-metal blank B after a first forming step. The shoulder 10b is bit-shaped and in cross-section it tapers to a tip.

A laser welding device 11 is preferably used to weld the slit profile Sr that is formed from the sheet-metal blank B. However, different welding means can also be used, for example inductive welding devices, which enable the adjacent longitudinal edges to be economically welded together in the region of the slit Z of the slit profile Sr.

The laser welding device 11 is attached to a carrier 12 that can be moved along the slit Z by means of a control device that is not shown. The carrier 12 also carries a postforming roller 13 arranged a small distance ahead of the laser welding device 11 in the direction of welding F. At least the laser welding device 11 should be enclosed in a housing, not shown, in order to protect the person operating the apparatus from the light.

In addition, the carrier 12 can be provided with a cleaning means, not shown here, to clean the welding zone before the laser welding device 11 reaches it. The cleaning means can aspirate, brush or wash away soiling present in the welding zone.

In order to level the strip edges, pads 14 or rollers can be provided, likewise attached to the carrier 12. The carrier 12 can also carry a supply line through which shielding gas is passed to the welding zone. Preferably, the carrier 12 is moved by a control device controllable with exactly three degrees of freedom (in the X, Y and Z directions).

In order to increase output when a fusion welding source is used, the apparatus 1 can be set up as a twin apparatus. This enables a fresh sheet-metal blank B to be fed into and formed on one apparatus while welding is still in progress on the other.

In the region within which the second tool part 3 moves, there is formed in the base plate G and extending in the longitudinal direction of the tool parts 2, 3, a recess 15a which accommodates a holding beam 16. The holding beam 16 can be raised by control devices, which are not shown, from a resting position in which its top surface 16a is level with the top face of the base plate G, into a holding position in which a holding slit 16b formed in the beam on the side adjacent the first tool part 2 is disposed with its lower edge level with the top face of the base plate G.

Stops 17, 18 in the form of centring levers are mounted on the tool parts 2, 3 and are movable from a resting position above the tool parts 2, 3 into an operating position in which they point in the direction of the base plate G over the upper longitudinal edge of the recesses 4, 5 of the tool parts 2, 3 and form the boundary of the recesses 4, 5 at these longitudinal edges.

At the beginning of the production process, the mandrel 8 is positioned in the area of one tool part 2 such that the portion of its circumference adjacent to this tool part 2 is disposed in the recess 4 of this tool part 2. A gap 15 is thereby formed between the peripheral surface of the mandrel 8 and the inside surface 6 of the recess 4, the thickness of the gap being a maximum of 0.2 mm larger than the thickness of the sheet-metal blank B that is to be shaped.

The holding beam 16 is in its raised position, so that its holding slit 16b is freely accessible.

The sheet-metal blank B is placed on the base plate G beneath the mandrel 8. The sheet-metal blank is positioned such that one of its longitudinal edges lies directly at the entry to the gap 15, while its other longitudinal edge lies in the holding slit 16b of the holding beam 16 (FIG. 1).

Lateral guides (not shown) provided on the tool parts 2, 3 and on the base plate G prevent the sheet-metal blank B from drifting during the rolling process that now commences. The first tool part 2 and the mandrel 8 are moved in the same direction towards the centre line M of the apparatus 1 such that the half of the sheet-metal blank B adjacent to the tool part 2 is automatically inserted into the gap 15 and curved to form one-half of the slit profile Sr that is to be preformed. This process continues until the longitudinal edge of this half abuts the stop 17 that defines the insertion limit for the insertion of this particular half of the sheet-metal blank B. During this rolling process, the other longitudinal edge of the sheet-metal blank B is held in the holding beam 16, which thereby provides an abutment for the forces that are generated when the sheet-metal blank B is inserted into the gap 15 (FIG. 2).

As soon as the first insertion limit is reached, the process step is halted and the tool part 2 together with the mandrel 8 is moved sufficiently far in the opposite direction for the sheet-metal blank B to be completely pulled out from the holding slit 16b of the holding beam 16. The holding beam 16 is then lowered into its resting position (FIG. 3).

After the holding beam 16 has been lowered, the mandrel 8 moves to the second tool part 3 and is oriented such as to form between the region of its periphery adjacent to the tool part 3 and the recess 5 of the tool part 3 a gap 19 having a thickness that is again slightly greater than the thickness of the sheet-metal blank B (FIG. 4).

Figure 5:
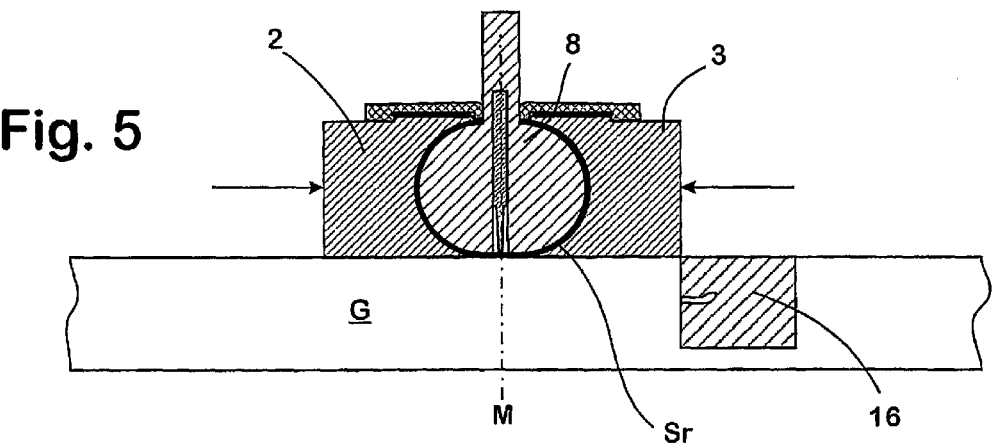

The tool part 3, together with the mandrel 8, is then moved in the direction of the centre line M. The longitudinal edge of the sheet-metal blank B adjacent to the tool part 3 is thereby inserted into the gap 19 so that as the tool part 3 and the mandrel 8 continue to move, the second half of the sheet-metal blank B is curved inside the gap 19 to form the second half of the slit profile Sr to be preformed until the insertion limit defined by the stop 18 at the upper longitudinal edge of the recess 7 is reached. In this position, the longitudinal axis of the mandrel 8 is coaxial with the centre line M of the apparatus 1. A pre-sizing step now takes place in which the two tool parts 2,3 are again brought together a short distance towards the centre line M. This sizes the slit profile Sr and also rounds the edge zones that define its slit Z (FIG. 5).

Figure 6:
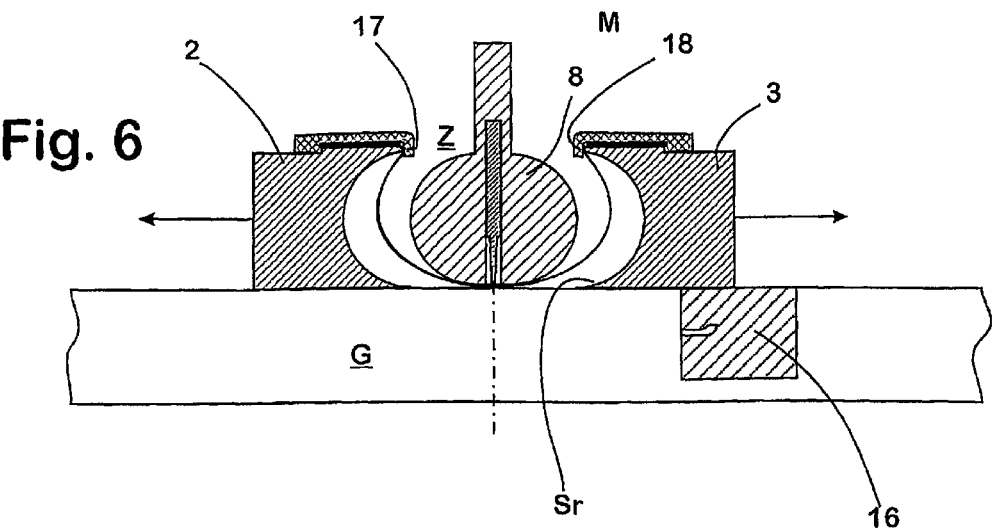

In the next step, the tool parts 2, 3 are moved apart. The halves of the slit profile Sr that lie in the recesses 4, 5 of the tool parts 2, 3 are pulled apart such that the width of the slit is greater than the width of the mandrel 8 (FIG. 6).

Figure 7:
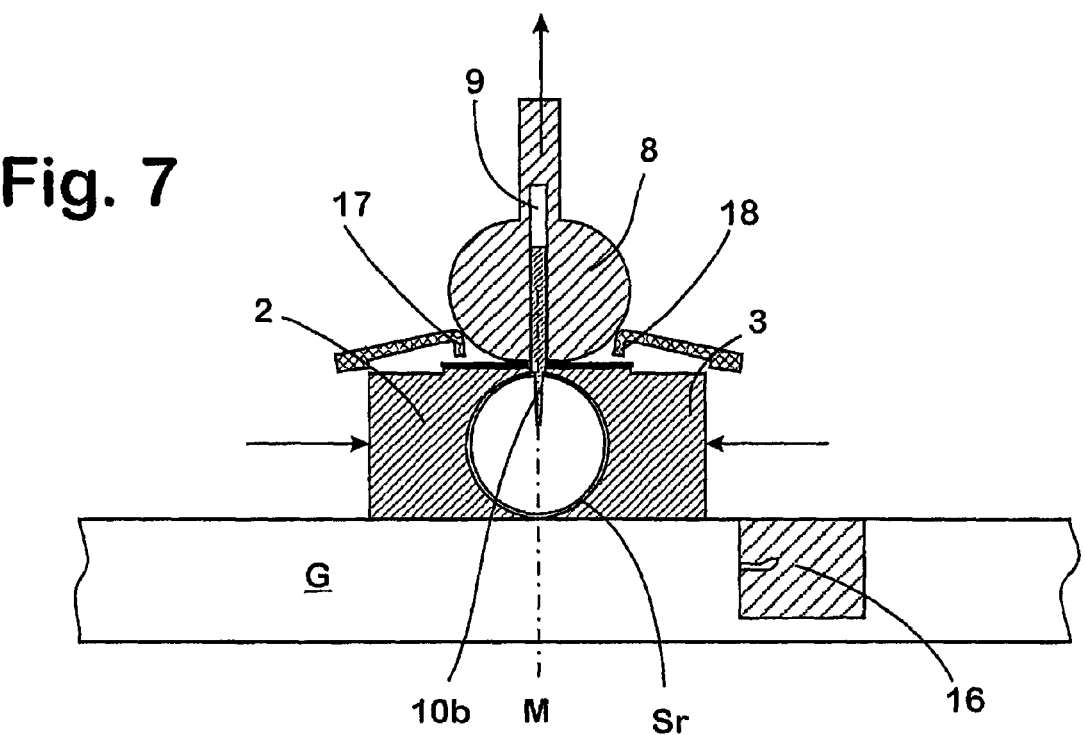

The mandrel 8 can now be moved vertically and if required horizontally out of the slit profile Sr until it reaches a first position outside the slit profile Sr. The tongue 10 then automatically moves out from the recess 9 of the mandrel 8. The first position of the mandrel 8 is such that the first shoulder 10b of the tongue 10 in this position is disposed in the region of the slit Z of the slit profile Sr. Stops 17, 18 on the tool parts 2, 3 each defining the limit of insertion are simultaneously moved into their resting position in which they are located outside the area of the slit Z and distant therefrom, on each of tool parts 2, 3. Both tool parts 2, 3 then move together again and press the longitudinal edges delimiting the slit Z against the shoulder 10b of the tongue 10. The small amount of additional movement as the tool parts come together provides the final sizing of the slit profile Sr, the high forces generated resulting in well-defined compression and shaping (FIG. 7).

Figure 8:
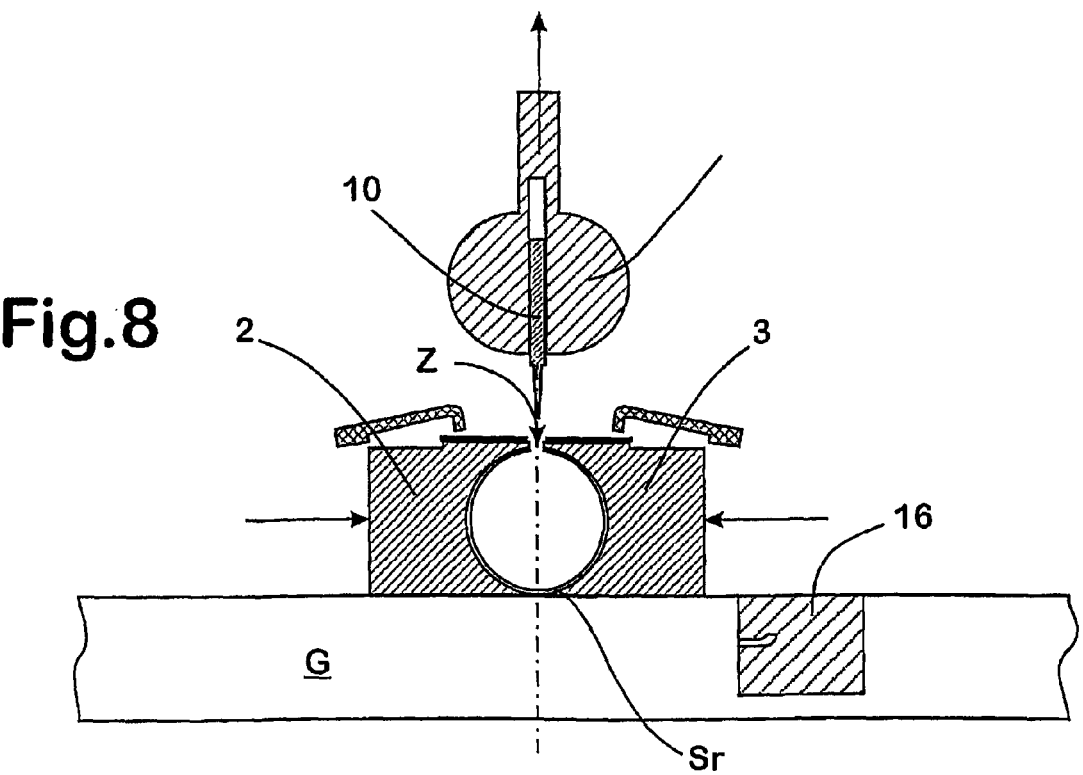

After this sizing step, the mandrel 8 is raised vertically until the tongue 10 is completely withdrawn from the slit Z of the slit profile Sr. Thereafter, or concurrently, the tool parts 2, 3 are moved towards one another until the longitudinal edges of the slit Z touch to form a square butt joint. Thereafter, the mandrel 8 is moved horizontally into a resting position (FIG. 8).

Figure 9:
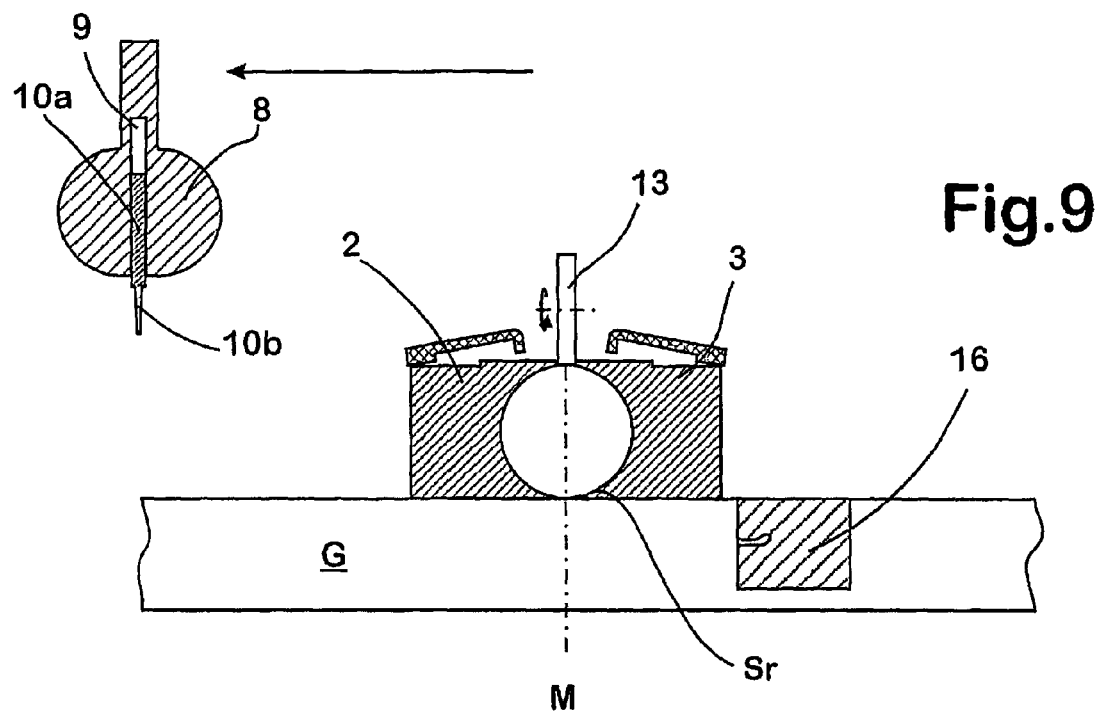

In the region of this butt joint, the longitudinal edges are welded together by the laser welding device 11 to produce a longitudinal seam-welded tubular hollow profile R (FIG. 9).

Figure 10:
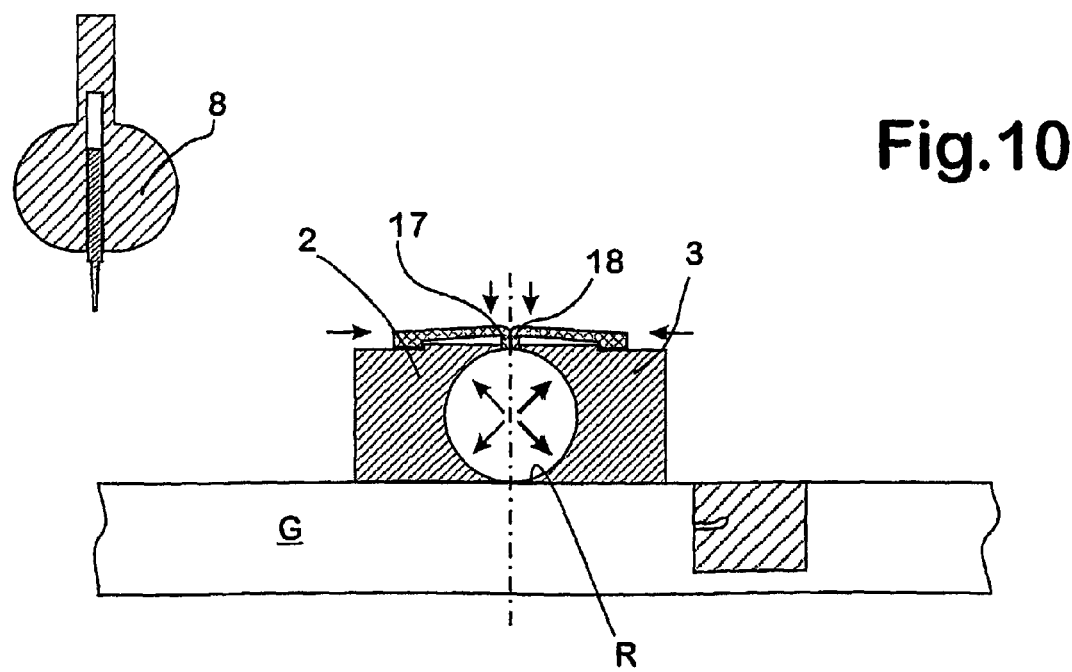
Figure 11:
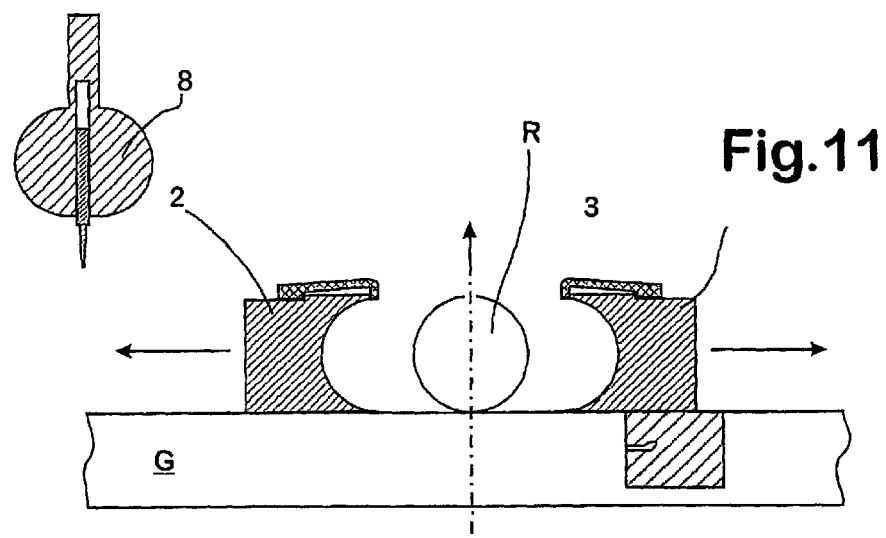
Figure 12:
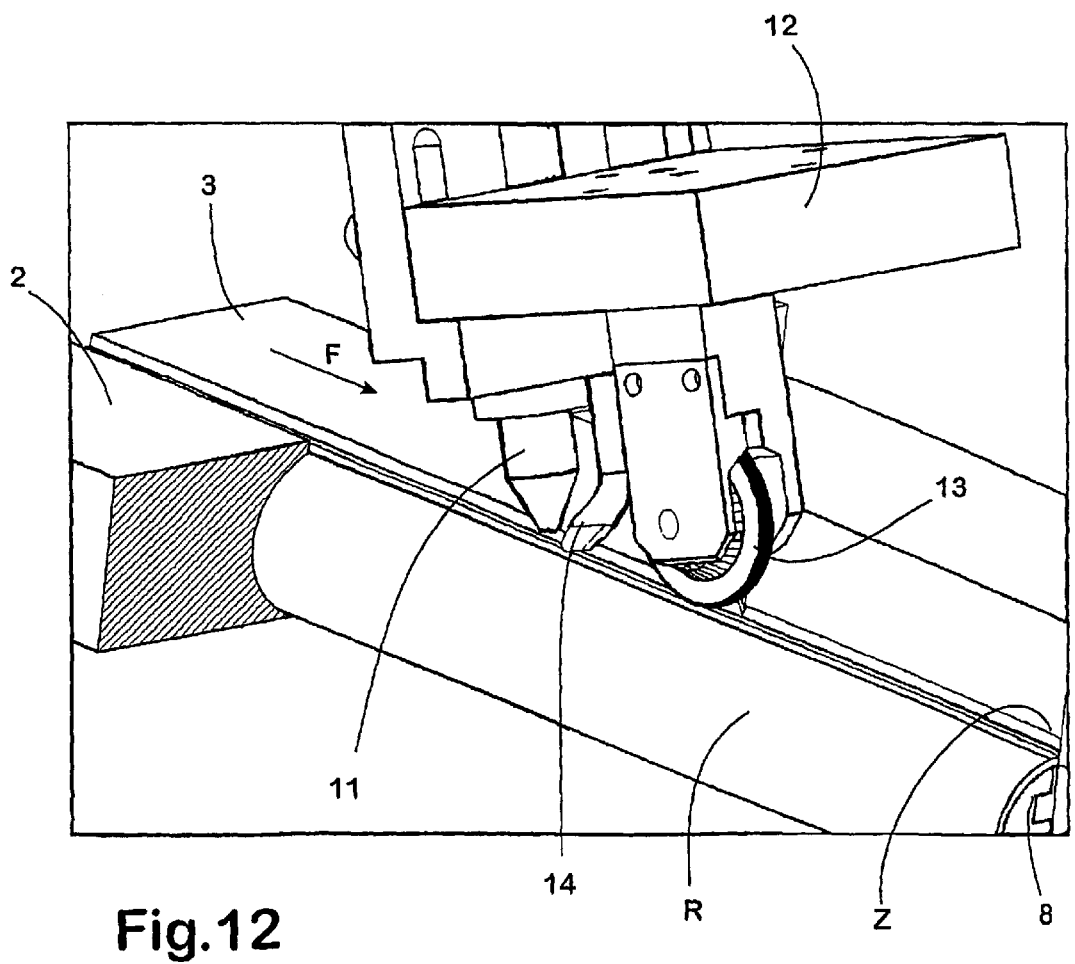
FIG. 12 is a partial cutaway perspective view of the apparatus of FIG. 1 welding a slit profile formed from the sheet-metal blank.

Internal high-pressure shaping is then carried out in order to further modify the shape of said tubular hollow profile R. For this purpose, the ends of the hollow profile R are sealed with hydraulic sealing cylinders, which are not shown, and the hollow profile R is filled through these cylinders with a working fluid which is at a pressure sufficient for shaping. During this process, the seam area of the hollow profile R is protected against unwanted bulging by suitable supporting means (not shown), such as for example stops 17, 18. Meanwhile, the tool parts 2, 3 are also locked into their positions. If the hollow profile R needs to be pushed in the longitudinal direction, the sealing cylinders can be used for this purpose (FIG. 10).

The finished tubular hollow profile R can be removed after the pressure has been released, the working fluid has been drawn off and the tool parts 2, 3 have been moved apart into their starting position.

REFERENCE NUMERALS

1 Apparatus for producing a hollow profile R
2, 3 Tool parts
4, 5 Recesses 6, 7 Inside surfaces of recesses 4, 5
8 Mandrel
9 Recess
10 Tongue
10a Upper portion of tongue 10
10b Shoulder of tongue 10
11 Laser welding device
12 Carrier
13 Postforming roller
14 Pads, roller
15 Gap
15a Recess
16 Holding beam
16a Top surface of the holding beam 16
16b Holding slit of the holding beam 16
17, 18 Stops
19 Gap
B Sheet-metal blank
F Direction of welding
G Base plate
M Centre line of apparatus 1
R Hollow profile
Sr Slit profile
Z Slit of slit profile Sr

The invention claimed is:

1. Method for the production of a longitudinal seam welded hollow profile from a sheet-metal blank with defined longitudinal edges
   wherein the sheet-metal blank is placed between two tool parts lying in a starting position in which they are apart, each provided with a recess determining an external shape of at least one section of the hollow profile that is to be produced,
   wherein a mandrel, whose external shape defines an internal shape of the hollow profile that is to be produced, is then positioned relative to the recess of one tool part such that a first gap is formed between a peripheral surface of the mandrel and an inside surface of the recess, a thickness of the first gap being slightly greater than a thickness of the sheet-metal blank that is to be shaped,
   wherein the sheet-metal blank is held in an area of the half that is distant from the mandrel,
   wherein the tool part adjacent to the mandrel is moved together with the mandrel, with the first gap intact, in the direction of the longitudinal edge of the sheet-metal blank that is distant from the mandrel such that the sheet-metal blank runs into the first gap along its longitudinal edge that is adjacent to the mandrel until it reaches an insertion limit,
   wherein the mandrel is positioned relative to the recess of the second tool part such that a second gap is formed between the peripheral surface of the mandrel and an inside surface of the said recess, a thickness of the second gap being slightly greater than the thickness of the sheet-metal blank that is to be shaped,
   wherein the tool part now adjacent to the mandrel is moved together with the mandrel, with the second gap intact, in the direction of the longitudinal edge of the sheet-metal blank that is distant from the mandrel such that the sheet-metal blank runs into the second gap along its longitudinal edge that is adjacent to the mandrel until it reaches an insertion limit and a slit profile that surrounds the mandrel about its peripheral surfaces is formed from the sheet-metal blank,
   wherein the mandrel is moved out from an interior of the slit profile,
   wherein the longitudinal edges of the sheet-metal blank that define the slit are welded together, the slit profile being supported by the tool parts, and
   wherein the tool parts are moved to their starting position in order for the finished welded hollow profile to be removed from the tool parts.

2. Method according to claim 1, wherein in order to allow the mandrel to be moved out from the slit profile, the tool parts together with the sections of the sheet-metal blank that lie in their respective recesses are moved sufficiently far apart for the mandrel to be moved through the enlarged opening between the two longitudinal edges of the slit profile.

3. Method according to claim 1, wherein the tool parts are pushed together after the mandrel has been moved out of the slit profile until the slit of the slit profile is closed or its width has reached a minimum.

4. Method according to claim 3, wherein the desired width of the slit is determined by a tongue held in the slit.

5. Method according to claim 4, wherein the tongue is carried by the mandrel.

6. Method according to claim 5, wherein the tongue is sword-shaped and extends along the length of the slit of the slit profile.

7. Method according to claim 3, wherein at least two steps are used to move the tool parts together in order to define the desired width.

8. Method according to claim 7, wherein the tongue has at least one shoulder.

9. Method according to claim 1, wherein the hollow profile is subjected to internal high-pressure shaping after welding with the tool parts still closed.

10. Method according to claim 1, wherein the mandrel is lowered onto the sheet-metal blank such that it exerts a pressure that securely holds the sheet-metal blank on an underlying surface.

11. Apparatus for producing a longitudinal seam welded hollow profile from a sheet-metal blank with defined longitudinal edges, provided with at least two tool parts that are movable together into a forming position from a starting position in which they are apart, and that each have a recess determining an external shape of at least one section of the hollow profile that is to be produced, and with a welding device for welding together the longitudinal edges of the sheet-metal blank after it has been formed into a slit profile, comprising
   a mandrel carried by a control device that moves it from a first position in which it is positioned in the recess of one tool part with a first gap between an inside surface of the recess of the said tool part and the peripheral surface of the mandrel, into a second position in which it is positioned in the recess of the second tool part with a second gap between an inside surface of the recess of said tool part and the peripheral surface of the mandrel, and
   a holding device for holding the sheet-metal blank in the region of one of its longitudinal edges.

12. Apparatus according to claim 11, wherein the mandrel carries a tongue that defines a desired width of the slit of the slit profile that is to be formed between the tool parts.

13. Apparatus according to claim 11, wherein each tool part is provided in the region of one longitudinal edge of its recess with a stop forming the insertion limit for a portion of a sheet-metal blank inserted into the recess.

14. Apparatus according to claim 13, wherein the stop can be moved from an operating position in which it is located on the longitudinal edge of the recess into a resting position.

15. Apparatus according to claim 11, wherein the control device lowers the mandrel onto the sheet-metal blank in order to exert a holding force on it.

16. Apparatus according to claim 11, wherein it comprises a means for the internal high-pressure shaping of the hollow profile held between the tool parts.

17. Apparatus according to claim 11, wherein it comprises a means for embossing the hollow profile held between the tool parts.

* * * * *